(12) United States Patent
Ibrahim et al.

(10) Patent No.: US 10,832,570 B1
(45) Date of Patent: Nov. 10, 2020

(54) V2X VEHICLE ROAD USAGE

(71) Applicant: FORD GLOBAL TECHNOLOGIES, LLC, Dearborn, MI (US)

(72) Inventors: Samer Ibrahim, Dearborn, MI (US); Jovan Milivoje Zagajac, Ann Arbor, MI (US); Krishna Bandi, Farmington Hills, MI (US); Syed Amaar Ahmad, Canton, MI (US); Azin Neishaboori, Plymouth, MI (US); Sushanta Das, Canton, MI (US); Ivan Vukovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/723,073

(22) Filed: Dec. 20, 2019

(51) Int. Cl.
  *G08G 1/01* (2006.01)
  *G06Q 30/02* (2012.01)
  *H04W 4/44* (2018.01)

(52) U.S. Cl.
  CPC ....... *G08G 1/0141* (2013.01); *G06Q 30/0284* (2013.01); *G08G 1/0116* (2013.01); *G08G 1/0133* (2013.01); *H04W 4/44* (2018.02)

(58) Field of Classification Search
  None
  See application file for complete search history.

(56) References Cited

U.S. PATENT DOCUMENTS

| | | | | |
|---|---|---|---|---|
| 8,918,279 B2 * | 12/2014 | Yonezawa | ........ | G08G 1/096811 |
| | | | | 701/414 |
| 10,395,332 B1 * | 8/2019 | Konrardy | .......... | G06F 16/90335 |
| 10,698,421 B1 * | 6/2020 | Harris | .................. | G05D 1/0289 |
| 2006/0158369 A1 * | 7/2006 | Shinoda | ................ | G01S 13/931 |
| | | | | 342/70 |
| 2010/0188265 A1 * | 7/2010 | Hill | ........................ | G08G 1/091 |
| | | | | 340/905 |
| 2012/0035848 A1 * | 2/2012 | Yonezawa | .......... | G01C 21/3492 |
| | | | | 701/414 |
| 2014/0275928 A1 * | 9/2014 | Acquista | ............ | A61N 1/36585 |
| | | | | 600/382 |
| 2019/0039463 A1 * | 2/2019 | Moghe | ..................... | B60L 53/12 |
| 2019/0120654 A1 * | 4/2019 | Todasco | ............ | G01C 21/3476 |
| 2020/0029233 A1 * | 1/2020 | Gallagher | .............. | G07C 5/008 |
| 2020/0128066 A1 * | 4/2020 | Sugimoto | ............... | H04L 67/18 |

* cited by examiner

*Primary Examiner* — Fekadeselassie Girma

(74) *Attorney, Agent, or Firm* — Michael J. Spenner; Brooks Kushman P.C.

(57) ABSTRACT

Vehicle road usage is monitored via vehicle-to-everything (V2X) communication. From each of a plurality of vehicles via one or more RSUs communicating with vehicles using V2X communication, anonymized data is received indicating routing of the respective vehicle along roadways over time and location. From each of the plurality of vehicles via the one or more RSUs, non-anonymized usage amounts are received indicative of a cost incurred by the respective vehicle for overall usage of the roadway by the respective vehicle, the usage amounts being computed by the respective vehicle according to usage metrics broadcast by the one or more RSUs. Roadway areas of high roadway usage are identified according to the anonymized data. The usage metrics are updated to incentivize alternative routes to routes traversing the roadway areas of high roadway usage. The usage metrics, as updated, are broadcast for receipt by the plurality of vehicles.

17 Claims, 4 Drawing Sheets

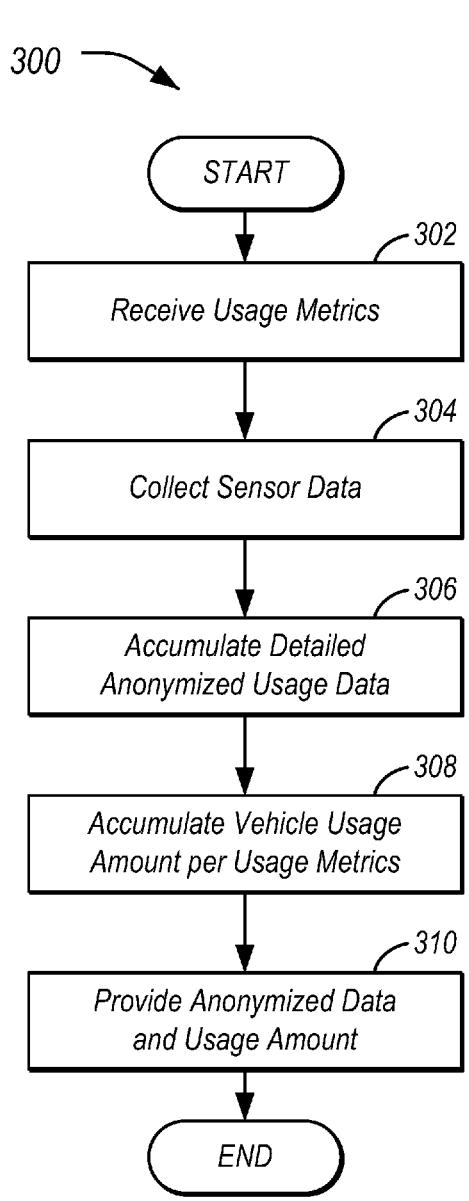
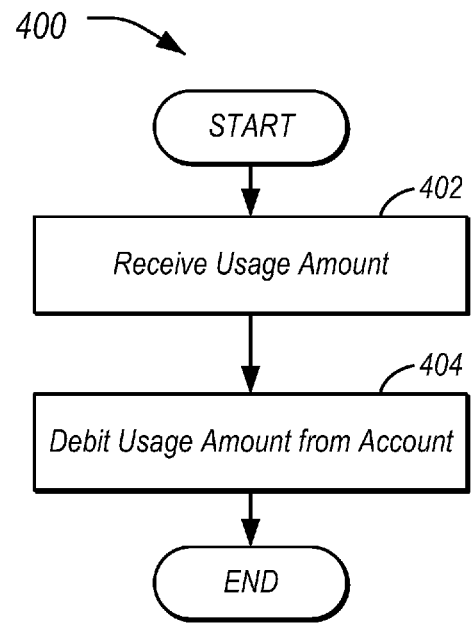
FIG. 4
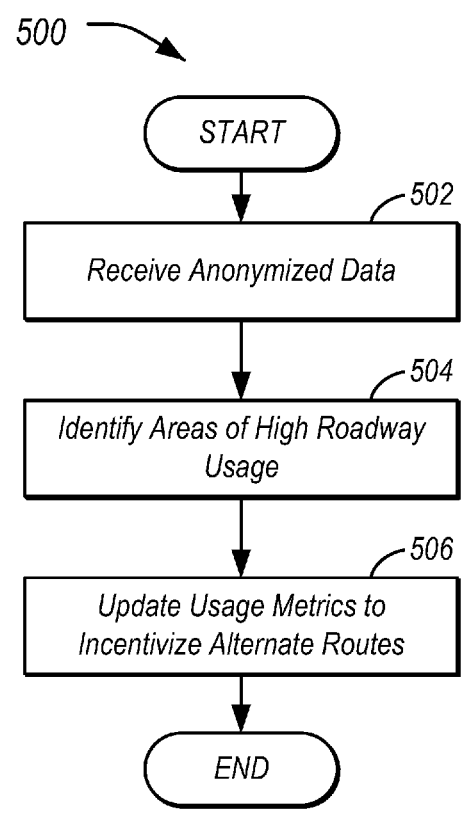
FIG. 3
FIG. 5

V2X VEHICLE ROAD USAGE

TECHNICAL FIELD

Aspects of the present disclosure generally relate to monitoring vehicle road usage via vehicle-to-everything (V2X) communication.

BACKGROUND

V2X allows vehicles to communicate and exchange information with other vehicles, as well as with infrastructure, pedestrians, networks, and other devices. Vehicle-to-infrastructure (V21) communication enables applications to facilitate and speed up communication or transactions between vehicles and infrastructure.

The cost for maintaining roads and managing traffic and congestion continues to increase. Electric vehicles do not use gasoline and, as such, are exempt from traditional fuel taxes currently used to fund road maintenance. Moreover, existing fuel taxes provide no information regarding which roads are actually traversed, leaving difficulty in understanding where maintenance may be desirable.

SUMMARY

In one or more illustrative examples, a system for monitoring vehicle road usage via vehicle-to-everything (V2X) communication includes one or more roadside unit (RSUs), each configured to communicate with vehicles using V2X communication; and a backend management service, in communication with the one or more RSUs. The backend management service is programmed to receive, from each of a plurality of vehicles via the one or more RSUs, anonymized data indicating routing of the respective vehicle along roadways over time and location; receive, from each of the plurality of vehicles via the one or more RSUs, non-anonymized usage amounts indicative of a cost incurred by the respective vehicle for overall usage of the roadway by the respective vehicle, the usage amounts being computed by the respective vehicle according to usage metrics broadcast by the one or more RSUs; identify roadway areas of high roadway usage according to the anonymized data; update the usage metrics to incentivize alternative routes to routes traversing the roadway areas of high roadway usage; and broadcast the usage metrics, as updated, for receipt by the plurality of vehicles.

In one or more illustrative examples, a vehicle for monitoring road usage via V2X communication, includes a telematics control unit (TCU) programmed to receive, via the V2X communication from one of a plurality of RSUs, usage metrics that specify costs for traversing lanes of a roadway; determine, according to the usage metrics, a usage amount indicative of a cost incurred by the vehicle for overall usage of the roadway; compile anonymized data indicating routing of the vehicle along roadways over time and location; broadcast the usage amount and the anonymized data, via the V2X communication, for receipt by one of the plurality of RSUs; and receive, via the V2X communication from one of a plurality of RSUs, updated usage metrics that incentivize alternative routes to routes traversing roadway areas of high roadway usage, the areas of high roadway usage being determined according to the anonymized data from the vehicle and anonymized data from a plurality of other vehicles.

In one or more illustrative examples, a method for monitoring vehicle road usage via vehicle-to-everything (V2X) communication, includes receiving, from each of a plurality of vehicles via one or more RSUs communicating with vehicles using V2X communication, anonymized data indicating routing of the respective vehicle along roadways over time and location; receiving, from each of the plurality of vehicles via the one or more RSUs, non-anonymized usage amounts indicative of a cost incurred by the respective vehicle for overall usage of the roadway by the respective vehicle, the usage amounts being computed by the respective vehicle according to usage metrics broadcast by the one or more RSUs; identifying roadway areas of high roadway usage according to the anonymized data; updating the usage metrics to incentivize alternative routes to routes traversing the roadway areas of high roadway usage; and broadcasting the usage metrics, as updated, for receipt by the plurality of vehicles.

BRIEF DESCRIPTION OF THE DRAWINGS

FIG. 3 illustrates an example process for using usage metrics to provide data from the vehicle to the roadside unit;

FIG. 4 illustrates an example process for updating vehicle accounts according to the usage amount;

FIG. 5 illustrates an example process for updating the usage metrics according to the anonymized data.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications.

With increasing costs for maintaining roads and managing traffic and congestion, it is desirable to create an accurate way of measuring road usage by vehicles. General traffic estimation and measurement approaches may lack the precision necessary. Improved ways of measuring an amount of road usage a vehicle incurs during a period of time could replace existing fuel taxes and the need for gated toll roads. Additionally, measuring overall usage for certain roads with lane usage accuracy can give insights regarding how to manage roads, traffic congestion, and construction projects.

Figure 1:
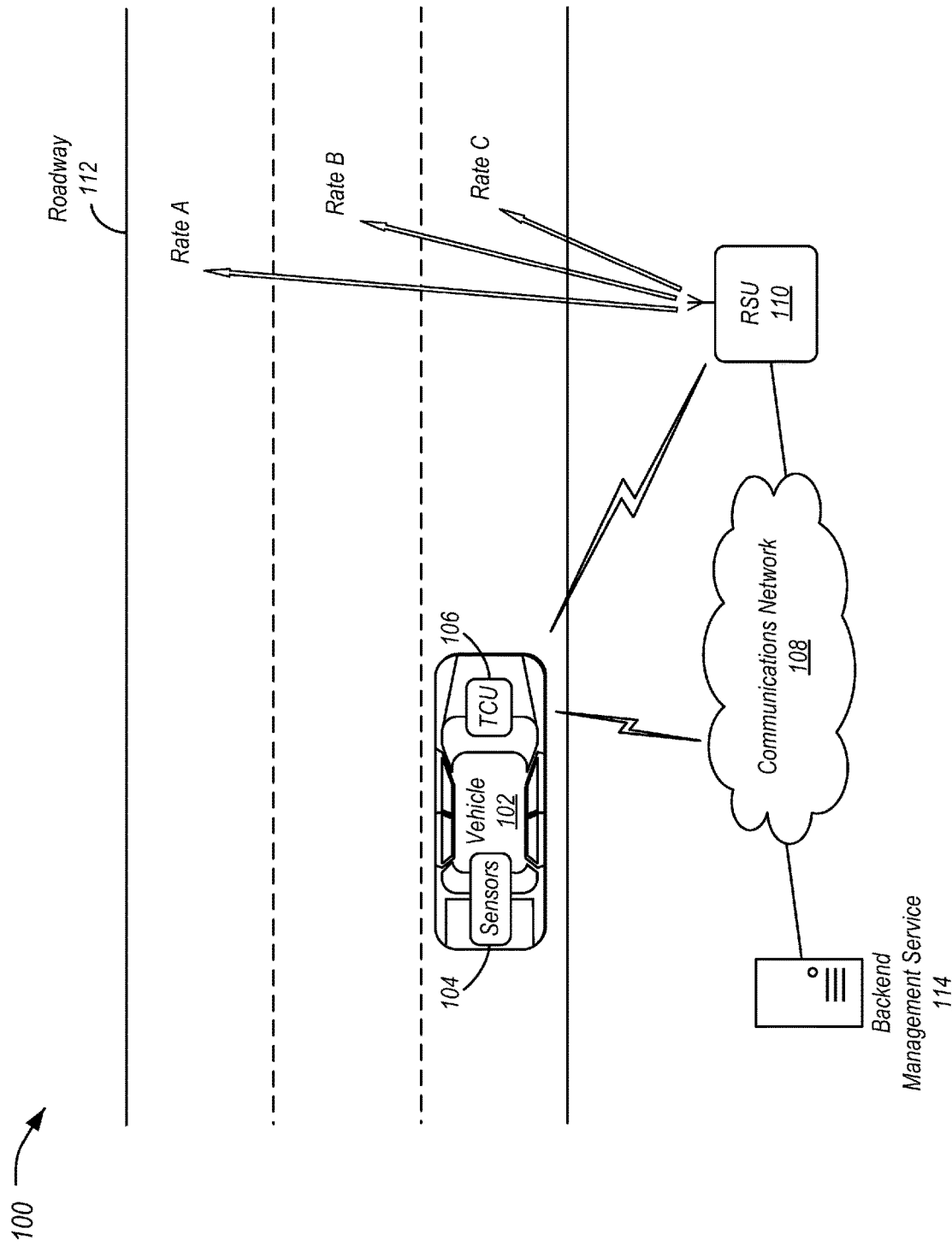
FIG. 1 illustrates an example management system for monitoring vehicle road usage via V2X communication.

FIG. 1 illustrates an example management system 100 for monitoring vehicle road usage via V2X communication. As shown, the system 100 includes one or more vehicles 102 equipped with telematics control units (TCUs) 106 which implement V2X functionality. The system 100 further includes roadside units (RSUs) 110 that also implement V2X functionality. A backend management service 114 is also included, which is configured to perform computations and recordkeeping operations. It should be noted that the system 100 is merely an example, and systems 100 having more, fewer, and different arrangements of elements may be used. For instance, one or more of the RSU 110 and backend management service 114 may be combined into a single device. Moreover, while only one vehicle 102 and one RSU 110 along one roadway 112 is shown, it is contemplated that systems 100 would include many vehicles 102, RSUs 110, and roadways 112.

The vehicles 102 may include various other types of passenger vehicles, such as sedans, crossover utility vehicles (CUVs), vans, sport utility vehicles (SUVs), trucks, recreational vehicles (RVs), scooters, drones, or other mobile machines for transporting people or goods. In many cases, the vehicle 102 may be powered by an internal combustion engine. In such cases, the fuel source may be gasoline or diesel fuel. As another possibility, the vehicle 102 may be a hybrid electric vehicle (HEV) powered by both an internal combustion engine and one or more electric motors, such as a series hybrid electric vehicle (SHEV), a parallel hybrid electric vehicle (PHEV), or a parallel/series hybrid electric vehicle (PSHEV). As yet a further possibility, the vehicle 102 may be an electric vehicle (EV) powered by electric motors without an internal combustion engine. As the type and configuration of vehicles 102 may vary, the capabilities of the vehicles 102 may correspondingly vary. As some other possibilities, vehicles 102 may have different capabilities with respect to passenger capacity, towing ability and capacity, and storage volume. For title, inventory, and other purposes, the vehicle 102 may be associated with a unique identifier, such as a vehicle identification number (VIN).

The vehicle 102 generally includes multiple sensors 104 that are used to operate various aspects of the vehicle 102. These sensors 104 may be connected to onboard vehicle 102 controllers that keep track of and compute various useful data items from the sensor inputs. This sensor data may include, as some non-limiting examples: absolute location and coordinates (e.g., location as determined according to a global national satellite system (GNSS)), location relative to the map and specific roads, location relative to a certain lane, vehicle size, vehicle weight, number of axles, and number of passengers. It should be noted that the vehicle 102 may additionally or alternately use dead-reckoning, e.g., via controller-area network (CAN) or other on-vehicle messages) to estimate the location of the vehicle for road usage when GNSS is unavailable (such as in downtown areas, urban canyons, or parking structures that may block GNSS signals). If positioning information is still unavailable, the vehicle 102 may log an error time and last known location, which may be collected and used to troubleshoot difficult areas.

The TCU 106 may be configured to provide telematics services to the vehicle 102. These services may include, as some non-limiting possibilities, navigation, turn-by-turn directions, vehicle health reports, local business search, accident reporting, and hands-free calling. The TCU 106 may, accordingly, be configured to communicate over various protocols, such as with a communication network 108 over a network protocol (such as Uu). The TCU 106 may, additionally, be configured to communicate over a broadcast peer-to-peer protocol (such as PC5), to facilitate C-V2X communications with devices such as the RSU 110. It should be noted that these protocols are merely examples, and different peer-to-peer and/or cellular technologies may be used.

The communications network 108 may provide communication services, such as packet-switched network services (e.g., Internet access, voice over Internet Protocol (VoIP) communication services), to devices connected to the communications network 108. An example of a communications network 108 is a cellular telephone network. For instance, the TCU 106 may access the cellular network via connection to one or more cellular towers. To facilitate the communications over the communications network 108, the TCU 106 may be associated with unique device identifiers (e.g., mobile device numbers (MDNs), Internet protocol (IP) addresses, etc.) to identify the communications of the TCU 106 on the communications network 108 as being associated with the vehicle 102.

The RSU 110 may be a device with processing capabilities and networking capabilities, and may be designed to be placed in proximity of a roadway 112 for use in communicating with vehicles 102. In an example, the RSU 110 may include hardware configured to communicate over the broadcast peer-to-peer protocol (such as PC5), to facilitate C-V2X communications with the vehicles 102. The RSU 110 may, accordingly, be able to communicate with multiple vehicles 102 along a specific roadway 112 or in a specific area. The RSU 110 may also have wired or wireless backhaul capability to allow for communication with other elements of the communications network 108, such as the backend management service 114.

The backend management service 114 may include one or more networked computing devices configured to perform operations in support of the functionality of the RSU 110. In an example, the backend management server 114 may be in communication with the RSU 110 over the communications network 108.

Figure 2:
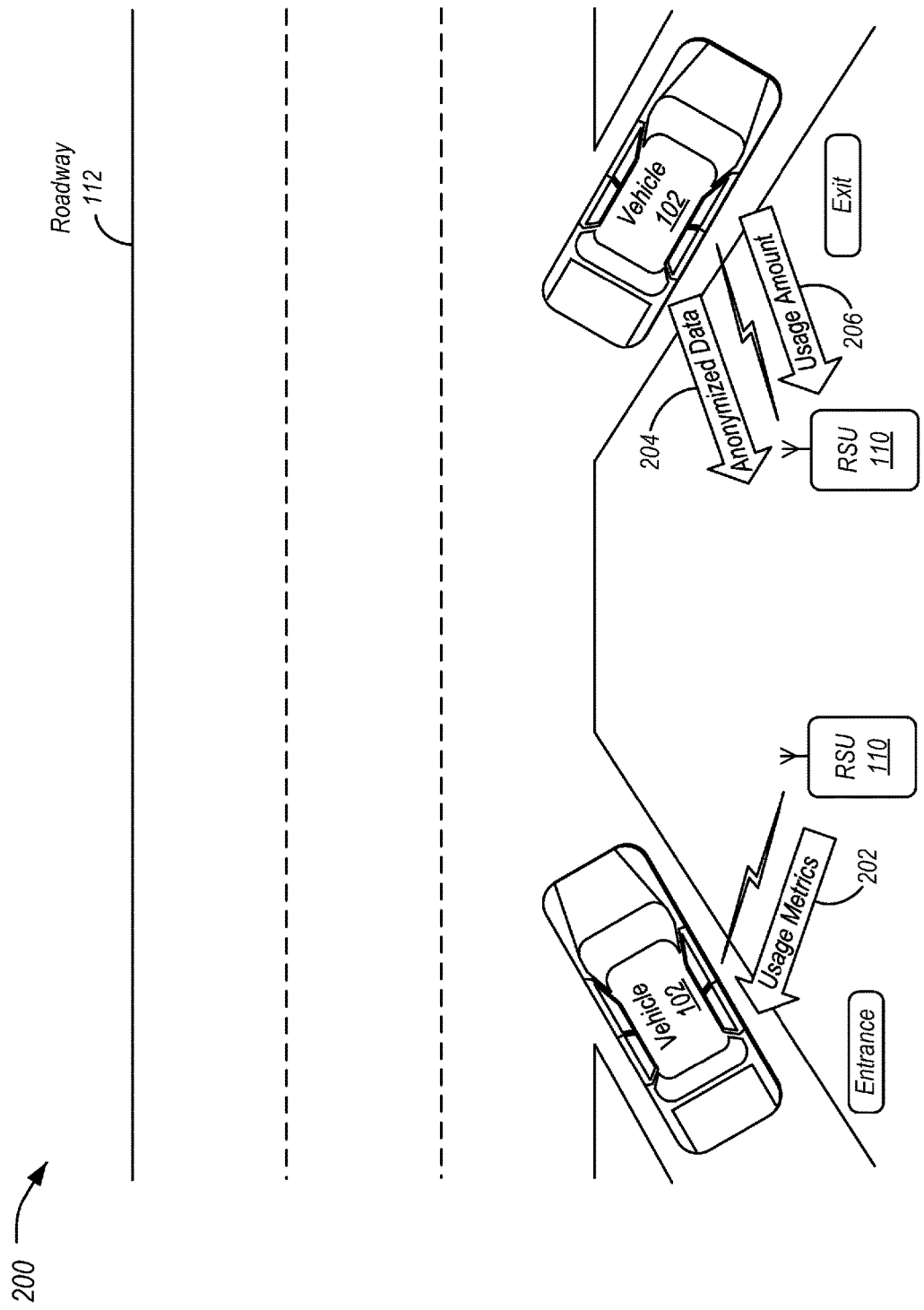
FIG. 2 illustrates an example of vehicles engaging the system to provide anonymized data and usage amounts based on receipt of usage metrics to the roadside units.

FIG. 2 illustrates an example 200 of vehicles 102 engaging the system 100 to provide anonymized data 204 and usage amounts 206 based on receipt of usage metrics 202 to the RSUs 110. Referring to FIG. 2, and with continued reference to FIG. 1, the backend management service 114 may be configured to define usage metrics 202 for each lane of the roadway 112. As shown, this information may be communicated to the vehicle 102 via V2X using the RSU 110. For instance, the vehicle 102 may receive the usage metrics 202 from a RSU 110 positioned at an entrance to a roadway 112.

The usage metrics 202 may be based on various aspects of travel of the vehicle 102. As some examples, the usage metrics 202 may be point-based or monetary-based, positive or negative. The usage metrics 202 may be variable and adjusted to optimizes traffic control. The usage metrics 202 may additionally or alternately be dependent on the vehicle 102 class, weight, number of axles, and number of passengers.

In a simple example, the usage metrics 202 may indicate that a cost to traverse the roadway 112 is a fixed amount. However, in many examples, the cost to traverse the roadway 112 may vary according to various factors. For instance, travel in a first lane may incur a first charge, while travel in another lane may incur a second, different, charge.

As indicated by the arrows in FIG. 1, each lane of the roadway 112 may be associated with a different cost for travel of the vehicle 102 down the roadway. For instance, the first, second, and third rates may be values in the form of 'X $/mile traveled'. In another example, the cost may vary based on the number of occupants of the vehicle 102. In yet a further example, the cost may vary based on the type of vehicle 102 (e.g., a semitruck may incur a greater charge than a passenger car). In an even further example, costs may vary based on other factors, such as amount of traffic, time of day, day of the week, and/or weather.

Referring back to FIG. 2, the vehicle 102 may receive the usage metrics 202. In an example, the vehicle 102 example, may receive the usage metrics 202 over V2X as broadcast from the RSU 110. In another example, the vehicle 102 may receive the usage metrics 202 through the cellular network 108. Using the usage metrics 202, the vehicle 102 or an occupant of the vehicle 102 may decide which roadway 112, or which lane of the roadway 112, to traverse.

For instance, the vehicle 102 may be configured to show the occupants of the vehicle 102 an estimated cost based on the route of the vehicle 102. The vehicle 102 may be further configured to provide alternative routing based on the usage metrics 202. Routing according to usage metrics 202 may be integrated with a navigation system of the vehicle 120, to give the vehicle 102 occupants options such as 'Fastest Route', 'Economical Route' and so on, allowing the occupants to choose which roadway 112 or lanes to take. As a specific example, the vehicle 102 may display a list of a plurality of routes to a destination, wherein each of the plurality of routes indicates a road usage cost for the vehicle 102 traversing the route computed using the usage metrics 202, and receive a selection of one of the plurality of routes to be traversed by the vehicle 102.

The vehicle 102 may also be configured to calculate its usage amount 206 according to the usage metrics 202 and the distance and/or route traveled by the vehicle 102. In one example, the vehicle 102 may include an internal counter that accumulates data regarding the usage amount 206. This accumulation may be based on the usage metrics 202 received from the management service 114. The vehicle 102 may then communicate the usage amount 206 to the management service 114, e.g., via the RSUs 110 (or in other examples, via cellular using the communications network 108). The RSU 110 may, likewise, be configured to collect information from the vehicle 102. The RSU 110 may receive this information and/or may relay the information to the backend management service 114.

In an example, one type of information that the RSU 110 collects from the vehicle 102 is anonymous, but detailed, data. This information is referred to herein as anonymized data 204. The anonymized data 204 includes information related to the routing of the vehicle 102 over time and location, as well as parameters of the functioning of the vehicle along that route. Using this data, the RSU 110 may calculate, or may provide information that the backend management service 114 can use to calculate, overall road usage by multiple vehicles 102. This anonymized data 204 may include data elements, including, but not limited to: current vehicle 102 location, road and lane; vehicle 102 fuel efficiency (either as history of samples or a compressed distribution) at certain roads and lanes; and vehicle characteristics such as weight or vehicle class. Notably, the anonymized data 204 does not include information that may be used to identify the vehicle 102 or occupants of the vehicle 102. Because this anonymized data 204 is so detailed, it is desirable instead to keep the identity of the occupants and the identity of the vehicle 102 private.

In another example, a second type of information that the RSU 110 collects from the vehicle 102 is a usage amount 206 calculated by the vehicle 102. As compared to the first type of information, the usage amount 206 includes data that may be linked to a particular vehicle 102, vehicle 102 occupant, or account. However, the usage amount 206 does not contain detailed trip information, such as the route traveled by the vehicle 102. Instead, the usage amount 206 may simply be a number identifying a cost incurred by the vehicle 102 using the roadway 112. This usage amount 206 could be communicated periodically as the vehicle 102 traverses along the roadway 112, or at an end of a trip or trip segment, such as when the vehicle 102 exits a defined roadway 112. For instance, as shown in FIG. 2, the vehicle 102 receives usage metrics 202 from an RSU 110 at an entrance of a roadway 112, and transmits its calculated usage amount 206 to another RSU 110 at the exit from the roadway 112. This information may be sent by the RSU 110 to the backend management service 114 where an action can be taken (e.g., initiation of a payment from an account of an occupant of the vehicle 102 based on the indicated total usage of the roadway 112).

The backend management service 114 is, accordingly, configured to collect information from the vehicles 102 and the RSU 110 to perform various processing tasks. These tasks include, as some examples: adjusting the usage metrics 202 based on current usage and desired usage, adjusting the usage metrics 202 based on current congestions due to accidents or other road conditions to shift vehicles to different lanes, identifying exact congestion location and the total amount of road wear and usage at specific roads and specific lanes, identifying exact metrics and behavior for road usage by vehicles 102 at different times and under different conditions, anticipating and planning for road repairs, and anticipating and planning for future construction and road projects.

It should be noted that, in some instances, the RSU 110 may additionally or alternately make some smart decisions locally that fall within its authority. In one example, the RSU 110 may perform congestion control decisions. For instance, if a specific lane is congested, the RSU 110 may dynamically modify the usage metrics 202 for the congested lane to distribute traffic more evenly between lanes. In another example, the RSU 110 may perform traffic light control. For instance, vehicles 102 which are paying more for high-efficiency lanes may also get preemptive rights at upcoming signals. Using information about the vehicles 102 in proximity to the RSU 110, the RSU 110 may apply extra time on green lights and reduced waiting time on red lights. In yet a further example, the RSU 110 may maintain a record of the speeds of vehicles 102 on each lane. The recent history and distribution of speed samples from the vehicles 102 may be used to inform both the vehicle occupants and the road operators about the efficiency of particular roads and lanes. For instance, if 80% of speed samples are above 65 MPH and 20% are below 10 MPH at certain spots, then this sharp difference can help detect high potential for sudden traffic pile-ups.

In some examples, the backend management service 114 may change the usage metrics 202 dynamically. In some instances, the rate of this change may be capped, e.g., to change no more frequently than once every X minutes (e.g., every 60 minutes). The vehicles 102 may acquire the usage metrics 202 responsive to receipt by the vehicle 102 of road map data updates from the RSU 110. The vehicle 102 or a navigation application in the vehicle 102 may subsequently use these usage metrics 202 to choose a route. However, too frequent updates to the usage metric 202 may result in routing fluctuations, which may be undesirable.

FIG. 3 illustrates an example process 300 for using usage metrics 202 to provide data from the vehicle 102 to the RSU 110. In an example, the process 300 may be performed by the vehicle 102 in the context of the system 100 discussed in detail herein.

The vehicle 102 receives usage metrics 202 at operation 302. In an example, the TCU 106 of the vehicle 102 may be configured to receive usage metrics 202 broadcast via V2X from an RSU 110. As a specific possibility, the vehicle 102 may receive the usage metrics 202 from an RSU 110 positioned at an entrance to a roadway 112. In another example, the TCU 106 may receive the usage metrics 202 via the cellular network 108.

At operation 304, the vehicle 102 collects sensor data. In an example, the TCU 106 (or another controller of the vehicle 102) receives sensor data from the sensors 104 of the vehicle 102. These sensors 104 may be connected to onboard vehicle 102 controllers that keep track of and compute various useful data items from the sensor inputs. The sensor data may include, as some non-limiting examples: absolute location and coordinates, location relative to the map and specific roads, location relative to a certain lane, vehicle size, vehicle weight, number of axles, and number of passengers.

The vehicle 102 accumulates anonymized data 204 at operation 306. In an example, this anonymized data 204 may include information such as: a history of the current vehicle 102 location, roadways 112 and lanes of the roadways 112 traversed by the vehicle; vehicle 102 fuel efficiency (either as history of samples or a compressed distribution) at certain roadways 112 and lanes of the roadways 112; and vehicle characteristics such as weight or vehicle class. This anonymized data 204 may be collected, in an example, by tracking vehicle position over time, and monitoring characteristics such as instant fuel usage in association with those location and time factors.

At operation 308, the vehicle 102 accumulates a usage amount 206 per the usage metrics 202. In an example, this usage amount 206 may simply be a number identifying a cost incurred by the vehicle 102 using this roadway 112. To determine the access cost, the TCU 106 (or another controller of the vehicle 102) utilizes the usage metrics 202. For instance, the usage metrics 202 may specify a cost per mile for traversing a roadway 112, and the vehicle 102 may utilize a local counter to accumulate the overall cost according to the distance that the vehicle 102 travels along the roadway 112. As another possibility, the usage metrics 202 may specify different costs for different lanes of the roadway 112, and the vehicle may accumulate the overall cost according to the lane costs and distance that the vehicle 102 travels along the specific lanes of the roadway 112. As a further possibility, the accrued cost may vary based on the number of occupants of the vehicle 102. In yet a further example, the cost may vary based on the type of vehicle 102 (e.g., a semitruck may incur a greater charge than a passenger car). In an even further example, costs may vary based on other factors, such as amount of traffic, time of day, day of the week, and/or weather. In yet a further example, the cost may be based in whole or in part on the amount of fuel used. Regardless, only a total cost may be provided by the vehicle 102, such that the specifics of where and who traveled with the vehicle 102 remain anonymous to the RSU 110 and backend management service 114.

The vehicle 102, at operation 310, provides the anonymized data 204 and the usage amount 206 to the RSU 110. In an example, the TCU 106 of the vehicle 102 may be configured to send the usage amount 206 to an RSU 110 in range via V2X. As a specific possibility, the vehicle 102 may send the usage amount 206 to an RSU 110 positioned at an exit from a roadway 112. The RSU 110 may forward the usage amount 206 and/or the anonymized data 204 to the backend management service 114. In another example, the TCU 106 may send the usage amount 206 via the cellular network 108. Similarly, the TCU 106 may send the anonymized data 204 to the RSU 110 via V2X, and/or to the backend management service 114 via cellular communication over the communications network 108. After operation 310, the process 300 ends.

FIG. 4 illustrates an example process 400 for updating vehicle 102 accounts according to the usage amount 206. In an example, the process 400 may be performed by the backend management service 114, in the context of the system 100. At operation 402, the backend management service 114 receives the usage amount 206 from the vehicle 102. In an example, the backend management service 114 receives the usage amount 206 as discussed above with respect to operation 310 of the process 300.

The usage amount 206 is debited at operation 404. In an example, the vehicle 102 is associated with a road usage account, and the amount of the usage amount 206 is charged to that account. This may be useful, for instance, in metering rides for vehicle-share or ride-share situations. It should be noted that the road usage account may be pre-pay, or post-pay, depending on the implementation. In another example, the debit is performed to an account corresponding to an occupant of the vehicle 102 as opposed to an account corresponding to the vehicle 102 itself. In yet a further example, the debit is performed to a fleet to which the vehicle 102 and/or the occupant is associated. In instances where there are multiple occupants, the debit may be allocated among the occupants of the vehicle 102 (e.g., charges incurred for vehicles 102 with multiple occupants are divided among the occupants). After operation 404, the process 400 ends.

FIG. 5 illustrates an example process 500 for updating the usage metrics 202 according to the anonymized data 204. In an example, the process 500 may be performed by the backend management service 114 and/or the RSU 110, in the context of the system 100. At operation 502, the backend management service 114 receives the anonymized data 204 from the vehicle 102. In an example, the backend management service 114 receives the anonymized data 204 as discussed above with respect to operation 310 of the process 300.

At operation 504, the backend management service 114 and/or the RSU 110 identifies areas of high roadway usage. In an example, the anonymized data 204 may be mapped onto roadway 112 data locations to identify lanes, road segments, roadways 112, or other subsets of routes in which usage is relatively high. High usage may be defined in various ways. For instance, exceeding a predefined threshold value of lane or roadway 112 usage (e.g., vehicles 102 per time period (e.g., day, hour, etc.), weight of vehicles 102 per time period, number of vehicle 102 occupants per time period) may be an indication of high roadway usage. In another example, usage that is a predefined number of standard deviations over average roadway usage may be an indication of high roadway usage.

The backend management service 114 and/or the RSU 110 updates the usage metrics 202, at operation 506, to incentivize alternate routes. For instance, based on the determinates of high roadway usage, the usage metrics 202 for those areas may be increased (and/or the usage metrics 202 for other alternate lanes, roadways 112, and/or routes may be decreased). This may be done to reallocate traffic to address the high roadway usage. The updated usage metrics 202 may accordingly be made available to the vehicles 102 (e.g., as discussed above with respect to operation 302 of the process 300). After operation 506, the process 500 ends.

Variations on the described systems 100 and processes 300-500 are contemplated. In one example, road usage metering may additionally or alternately include time metering. In such an example, the system 100 may determine a time that the vehicle 102 spends while parked at a designated parking spot or location. This feature may be applicable for parking fees based on time of entry and exit. For instance, parking rate information may be provided as usage metrics 202 by a RSU 110 located at an entrance to a parking garage or parking lot, and the usage amount 206 for the duration of time in the parking garage may be provided from the vehicle 102 to a RSU 110 at an exit to the parking garage or lot when the vehicle 102 exits.

Given that road networks are vast and complex, simpler representations can capture the anonymized data 204 depending on a size of the memory available to the vehicle 102 and/or to the backend management service 114/RSU 110. For instance, rather than accumulating usage across all road segments or geographic areas, the system 100 may divide the overall usage according to road categories if lane level usage consumes excessive memory or bandwidth (e.g., the road usage may be bucketed into predefined categories for accumulation, such as interstates, state highways, arterials and parking). As another possibility, the overall usage may be divided into certain pre-defined and designated (i.e., toll) roadway 112 sections instead of for all roadway 112 surfaces.

Figure 6:
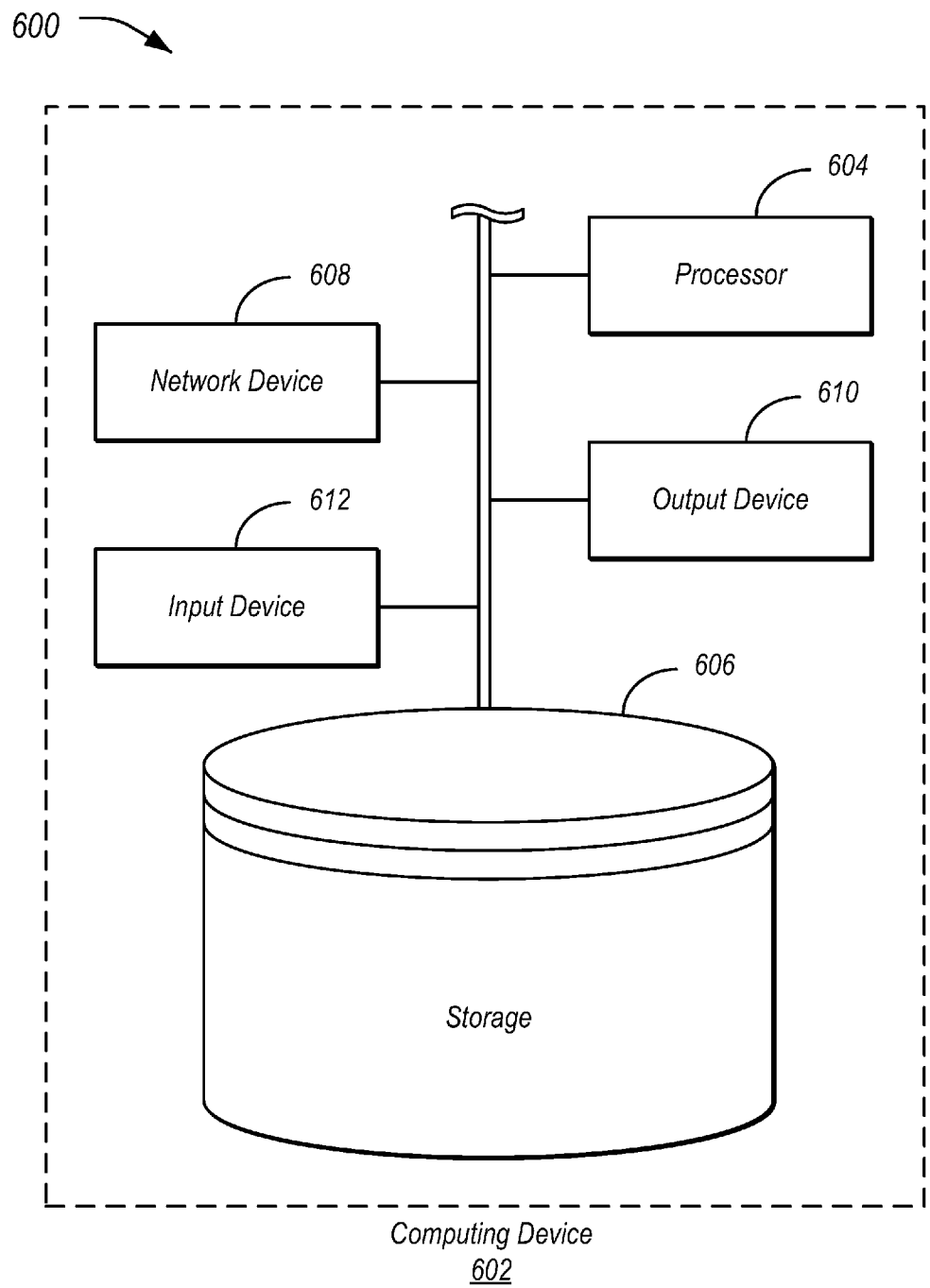
FIG. 6 illustrates an example computing device.

FIG. 6 illustrates an example 600 of a computing device 602. Referring to FIG. 6, and with reference to FIGS. 1 and 2, the TCU 106, RSU 110, and backend management service 114 may be examples of such computing devices 602. As shown, the computing device 602 may include a processor 604 that is operatively connected to a storage 606, a network device 608, an output device 610, and an input device 612. It should be noted that this is merely an example, and computing devices 602 with more, fewer, or different components may be used.

The processor 604 may include one or more integrated circuits that implement the functionality of a central processing unit (CPU) and/or graphics processing unit (GPU). In some examples, the processors 604 are a system on a chip (SoC) that integrates the functionality of the CPU and GPU. The SoC may, optionally, include other components such as, for example, the storage 606 and the network device 608 into a single integrated device. In other examples, the CPU and GPU are connected to each other via a peripheral connection device such as PCI express or another suitable peripheral data connection. In one example, the CPU is a commercially available central processing device that implements an instruction set such as one of the x86, ARM, Power, or MIPS instruction set families.

Regardless of the specifics, during operation the processor 604 executes stored program instructions that are retrieved from the storage 606. The stored program instructions, accordingly, include software that controls the operation of the processors 604 to perform the operations described herein. The storage 606 may include both non-volatile memory and volatile memory devices. The non-volatile memory includes solid-state memories, such as NAND flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU may include hardware and software for display of at least two-dimensional (2D) and optionally three-dimensional (3D) graphics to the output device 610. The output device 610 may include a graphical or visual display device, such as an electronic display screen, projector, printer, or any other suitable device that reproduces a graphical display. As another example, the output device 610 may include an audio device, such as a loudspeaker or headphone. As yet a further example, the output device 610 may include a tactile device, such as a mechanically raiseable device that may, in an example, be configured to display braille or another physical output that may be touched to provide information to a user.

The input device 612 may include any of various devices that enable the computing device 602 to receive control input from users. Examples of suitable input devices that receive human interface inputs may include keyboards, mice, trackballs, touchscreens, voice input devices, graphics tablets, and the like.

The network devices 608 may each include any of various devices that enable the TCU 106, RSU 110, and backend management service 114 to send and/or receive data from external devices over networks (such as the communications network 108). Examples of suitable network devices 608 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system for monitoring vehicle road usage via vehicle-to-everything (V2X) communication, comprising:
   one or more roadside unit (RSUs), each configured to communicate with vehicles using V2X communication; and
   a backend management service, in communication with the one or more RSUs, programmed to receive, from each of a plurality of vehicles via the one or more RSUs, anonymized data indicating routing of the respective vehicle along roadways over time and location;
receive, from each of the plurality of vehicles via the one or more RSUs, non-anonymized usage amounts indicative of a cost incurred by the respective vehicle for overall usage of the roadway by the respective vehicle, the usage amounts being computed by the respective vehicle according to usage metrics broadcast by the one or more RSUs, the usage metrics specifying a cost per unit distance for traversing lanes of the roadway, the plurality of vehicles utilizing local counters to accumulate the cost according to a distance that the respective vehicle travels along the lanes of the roadway;
identify roadway areas of high roadway usage according to the anonymized data;
update the usage metrics to incentivize alternative routes to routes traversing the roadway areas of high roadway usage; and
broadcast the usage metrics, as updated, for receipt by the plurality of vehicles.

2. The system of claim 1, wherein the usage metrics specify costs that vary according one or more of: a number of occupants of the respective vehicle, a type of the respective vehicle, a weight of the vehicle, a time of day, a day of the week, and/or weather conditions along the roadway.

3. The system of claim 1, wherein a first RSU of the one or more RSUs is located at an entrance to one of the roadways and a second RSU of the one or more RSUs is located at an exit from one of the roadways, and the backend management service is further programmed to:
send the usage metrics, to one vehicle of the plurality of vehicles via the first RSU; and
receive the usage amounts, from the one vehicle, via the second RSU, wherein the usage amounts are indicative of usage of the roadway between the entrance and the exit.

4. The system of claim 1, wherein the usage metrics indicate charges per unit time in a parking area, and the usage amounts indicate a charge for an amount of time that the vehicle spent in the parking area.

5. The system of claim 1, wherein the backend management service is further programmed to identify roadway areas of high roadway usage according to an accumulation of roadway usage for the roadway areas being a predefined number of standard deviations over average roadway usage across all roadway areas.

6. The system of claim 1, wherein the backend management service is further programmed to identify roadway areas of high roadway usage according to an accumulation of roadway usage for the roadway areas exceeding a predefined threshold value of usage, the predefined threshold specifying one or more of vehicles per time period, weight of vehicles per time period, or number of vehicle occupants per time period.

7. A vehicle for monitoring road usage via V2X communication, comprising:
a telematics control unit (TCU) programmed to
receive, via the V2X communication from one of a plurality of RSUs, usage metrics that specify costs per unit distance for traversing lanes of a roadway;
utilize a local counter to accumulate, according to the usage metrics, a usage amount indicative of a cost incurred by the vehicle for overall usage of the roadway according to a distance that the vehicle travels along the lanes of the roadway;
compile anonymized data indicating routing of the vehicle along roadways over time and location;
broadcast the usage amount and the anonymized data, via the V2X communication, for receipt by one of the plurality of RSUs; and
receive, via the V2X communication from one of a plurality of RSUs, updated usage metrics that incentivize alternative routes to routes traversing roadway areas of high roadway usage, the areas of high roadway usage being determined according to the anonymized data from the vehicle and anonymized data from a plurality of other vehicles.

8. The vehicle of claim 7, wherein the V2X communication is performed over one or more of a PC5 interface or a Uu interface.

9. The vehicle of claim 7, wherein the usage metrics specify costs that vary according one or more of: a number of occupants of the respective vehicle, a type of the respective vehicle, a weight of the vehicle, a time of day, a day of the week, and/or weather conditions along the roadway.

10. The vehicle of claim 7, wherein the usage metrics indicate charges per unit time in a parking area, and the vehicle utilizes a local counter to accumulate the cost according to an amount of time that the vehicle spends in the parking area.

11. The vehicle of claim 7, wherein the TCU is further programmed to cause the vehicle to:
display a list of a plurality of routes to a destination, wherein each of the plurality of routes indicates a road usage cost for the vehicle traversing the route computed using the usage metrics; and
receive a selection of one of the plurality of routes to be traversed by the vehicle.

12. A method for monitoring vehicle road usage via vehicle-to-everything (V2X) communication, comprising:
receiving, from each of a plurality of vehicles via one or more RSUs communicating with vehicles using V2X communication, anonymized data indicating routing of the respective vehicle along roadways over time and location;
receiving, from each of the plurality of vehicles via the one or more RSUs, non-anonymized usage amounts indicative of a cost incurred by the respective vehicle for overall usage of the roadway by the respective vehicle, the usage amounts being computed by the respective vehicle according to usage metrics broadcast by the one or more RSUs, the usage metrics specifying a cost per unit distance for traversing lanes of the roadway, the plurality of vehicles utilizing local counters to accumulate the cost according to a distance that the respective vehicle travels along the lanes of the roadway;
identifying roadway areas of high roadway usage according to the anonymized data;
updating the usage metrics to incentivize alternative routes to routes traversing the roadway areas of high roadway usage; and
broadcasting the usage metrics, as updated, for receipt by the plurality of vehicles.

13. The method of claim 12, wherein the usage metrics specify costs that vary according one or more of: a number of occupants of the respective vehicle, a type of the respective vehicle, a weight of the vehicle, a time of day, a day of the week, and/or weather conditions along the roadway.

14. The method of claim 12, wherein a first RSU of the one or more RSUs is located at an entrance to one of the roadways and a second RSU of the one or more RSUs is located at an exit from one of the roadways, and further comprising:
   sending the usage metrics, to one vehicle of the plurality of vehicles via the first RSU; and
   receiving the usage amounts, from the one vehicle, via the second RSU, wherein the usage amounts are indicative of usage of the roadway between the entrance and the exit.

15. The method of claim 12, wherein the usage metrics indicate charges per unit time in a parking area, and the usage amounts indicate a charge for an amount of time that the vehicle spent in the parking area.

16. The method of claim 12, further comprising identifying roadway areas of high roadway usage according to an accumulation of roadway usage for the roadway areas being a predefined number of standard deviations over average roadway usage across all roadway areas.

17. The method of claim 12, further comprising identifying roadway areas of high roadway usage according to an accumulation of roadway usage for the roadway areas exceeding a predefined threshold value of usage, the predefined threshold specifying one or more of vehicles per time period, weight of vehicles per time period, or number of vehicle occupants per time period.

\* \* \* \* \*